Patented Sept. 2, 1941

2,254,395

UNITED STATES PATENT OFFICE 2,254,395

PIGMENT

Swanie S. Rossander, Wilmington, Del., and Harold E. Woodward, Penns Grove, N. J., assignors to E. I. du Pont de Nemours & Company, Wilmington, Del., a corporation of Delaware No Drawing. Application September 6, 1939, Serial No. 293,569

9 Claims. (Cl. 260—176)

This invention relates to new insoluble azo compounds which are obtainable by coupling a class of azotized 3,3'-diphenyl-benzidines with a class of azo dye coupling components and especially to such azo compounds which are useful for pigmenting rubber and oily mixtures, such as inks and paints, because of their high tinctorial value, insolubility, light fastness, resistance to migration and other desirable properties.

Various products made by coupling azotized 3,3'-diphenyl-benzidine with coupling components, such as naphthionic acid, Broenner's acid, R-salt, H-acid, J-acid, gamma acid and Chromotrope acid are known such as those which are described by Hartley and Lyons in "Proceedings of the Indiana Academy of Science," vol. 44, page 124 (1934). These are textile dyes, soluble in water and are not suitable for use as rubber pigments. Compounds made by coupling azotized 3,3'-diphenyl-benzidines with beta-naphthol are also known but they bleed in rubber and oils. Compounds made by coupling azotized 3,3'-dimethyl-benzidine with aceto-acetarylamides and phenyl-methyl pyrazolone migrate in rubber and bleed in oils. Still other compounds made by coupling tetrazotized 3,3'-dichlor-benzidine with aceto-acetanilide or phenyl-methyl-pyrazolone are known pigments. While the latter azo compounds are mentioned in prior art as pigments for rubber they are not entirely satisfactory in that they show some migration in rubber and they are not entirely satisfactory for coloring inks and paints.

It is an object of this invention to provide improved yellow, orange and red disazo pigments having improved non-bleeding properties and satisfactory light fastness when used to pigmentize rubber and mixtures in oil. Another object of the invention is to provide pigments having the described desirable properties which are made by coupling one of a class of tetrazotized 3,3'-diphenyl benzidines with suitable coupling components. Other objects of the invention will be apparent from the following description.

The invention will be more fully set forth in the following more detailed description which includes examples that are given as illustrative embodiments of the invention and not as limitations thereof. Parts are expressed in parts by weight.

Example 1

A suspension of 409 parts of 3,3'-diphenyl-benzidine-hydrochloride in 5,000 parts of water was tetrazotized by adding 110 parts of hydrochloric acid (100%) and 138 parts of sodium-nitrite at 10°–15° C. The solution was filtered through charcoal to obtain a clear yellow solution. The solution was added to a suspension made by dissolving 370 parts of aceto-acet-anilide in 5,000 parts of water containing 88 parts of sodium-hydroxide, adding 280 parts sodium acetate and then making slightly acid to litmus with 80 parts of hydrochloric acid (100%). After the coupling was complete the mixture was heated to 90° C., filtered and washed. The dried product was a yellowish orange powder. When ground in lithographic varnish it gave a reddish yellow ink of good tinting strength, non-bleeding in linseed oil, and of good fastness to light. When incorporated in rubber compositions, it gave a reddish yellow of good tinting strength when the rubber was vulcanized, and showed no migration into white rubber. The compound is represented by the formula

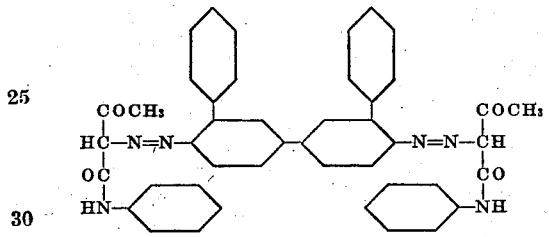

Example 2

When 400 parts of aceto-acetyl-ortho-toluidine were used as the coupling component in the process of Example 1 instead of 370 parts of aceto-acet-anilide, the product was a bright greenish yellow pigment having properties similar to those of the product of Example 1. This product is represented by the following formula

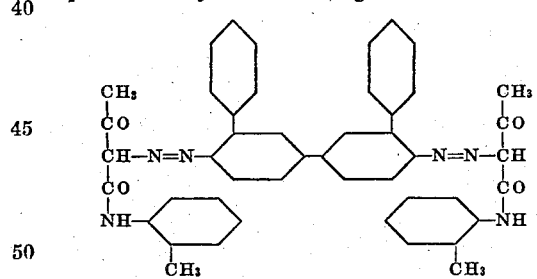

Example 3

By using an equivalent amount of the meta-xylidide of acetoacetic acid in the process of Example 1 instead of 370 parts of aceto-acetanilide, a product which was redder than that produced in accordance with Example 2 was produced. This product is represented by the formula

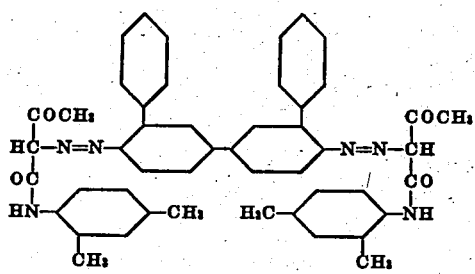

This product was similar to the products of Examples 1 and 2 with respect to tinctorial value, light fastness, lack of migration in rubber and lack of bleeding in oil-containing paints.

*Example 4*

When 365 parts of 1-phenyl-3-methyl-5-pyrazolone were substituted for 370 parts of aceto-acet-anilide in the process of Example 1, a reddish orange pigment having properties similar to those of the product of Example 1 was obtained. It is represented by the formula

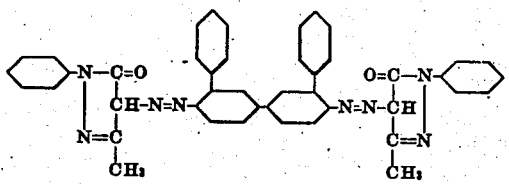

*Example 5*

When 460 parts of 1-meta-nitro-phenyl-3-methyl-5-pyrazolone were substituted for 370 parts of aceto-acet-anilide in the process of Example 1, a red pigment, non-bleeding in oil and non-migrating in rubber, was obtained.

*Example 6*

When 260 parts of barbituric acid were used in place of 370 parts of aceto-acet-anilide in the process of Example 1, a light red pigment was obtained. It was non-bleeding in oil. The structural formula of this compound, in one of its tautomeric forms is represented by the following formula

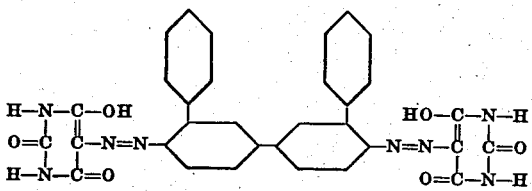

The pigment colors which give satisfactory results similar to the compounds of the foregoing examples are those having radicals of diamines of the diphenyl benzidine series which are free of groups which make the colors soluble in water and non-aqueous organic compounds used in rubber, resins, paints and lacquers, such as oils and organic solvents. The diazo component may be any radical of the diphenyl benzidine series as long as it does not contain such a solubilizing group. Substituents which should not be present are those such as carboxylic, sulfonic acid and alkyl groups having 3 or more carbon atoms. The preferred derivatives of the diphenyl ben- zidine series are those which are substituted by halogen, nitro, methoxy or ethoxy but any substituents may be present which do not cause solubility. The diphenyl nuclei and the substituent phenyl groups may be unsubstituted, one may be substituted or both may be substituted. As other illustrations of such compounds the following are mentioned: 2,2'-dichlor 5,5'-diphenyl benzidine, 3,3'-di(p-brom-phenyl) benzidine, 3,3'-di para anisyl benzidine and 3,3'-di(p-nitrophenyl) benzidine. The preferred pigment colors are those in which the first component is 3,3'-diphenyl benzidine.

Any azo dye coupling component can be used which has an active methylene group in a tautomeric enol form and which is devoid of groups which make the coupled products soluble, such as those which must not be present in the diazo component. The preferred coupling components are the acyclic diketones of this class, and of these the arylamides of acetoacetic acid of the benzene and naphthalene series are preferred.

From the standpoint of excellent working properties in rubber are those in which the coupling component is an acyclic diketone and of these the arylamides of acetoacetic acid represented by the formula

in which R is the radical of benzene, naphthalene, phenyl thiazole, carbazole and the mono- di- and tri-substituted derivatives of benzene and naphthalene where the substituents are from the group consisting of methyl, ethyl, methoxy, ethoxy and halogen are preferred.

As illustrative of the many compounds which can be used as coupling components are the ortho-chlor-anilide, the p-toluidide, the o-anisidide, the p-phenetidide and the 3-chlor-4-ethoxy anilide of acetoacetic acid, the alpha and beta naphthylamides of acetoacetic acid, 2-methoxy-1-naphthylamide of acetoacetic acid, acetyl acetone, benzoyl acetone, dibenzoyl methane, dihydro resorcin, benzotetronic acid, 2,4-dihydroxy quinoline, benzoyl nitro methane, the 1-aryl-5-pyrazolones of the benzene and naphthalene series, such as 1-phenyl-3-methyl-5-pyrazolone, 1-phenyl-5-pyrazolone-3-carboxylic acid ethyl ester, 1-naphthyl-3-methyl-5-pyrazolone, 1-(3'-methyl phenyl)-3-methyl-5-pyrazolone, 1-(4'-methoxy phenyl)-3-methyl-5-pyrazolone, 1-(3'-chlor phenyl)-3-methyl-5-pyrazolone, 1-(3'-chlor-5'-methyl phenyl)-3-methyl-5-pyrazolone and 1-(3'-ethoxy phenyl)-3-methyl-5-pyrazolone.

The compounds of the invention are useful as pigments especially when incorporated in rubber mixtures in which they give various shades ranging from red to yellow. They are also useful for pigmentizing resins, plastics, coating materials, printing materials and other compositions containing oleaginous and non-oil vehicles.

From the foregoing description it will be apparent to those skilled in the art that the invention is susceptible of modification without departing from the spirit and scope thereof and it is to be understood that the invention is not limited to the specific illustrations herein set forth.

We claim:

1. A disazo pigment color in which the radical of one component is a radical of a diamine of the 3-3'-diphenyl benzidine series and the radicals of the coupling components are the same members of a group consisting of radicals of azo dye coupling components having an active methylene group in a tautomeric enol form, said pigments being devoid of solubilizing groups.

2. A disazo pigment color in which the radical of one component is the radical of 3,3'-diphenyl benzidine and the radicals of the coupling components are the same members of a group consisting of radicals of azo dye coupling components having an active methylene group in a tautomeric enol form and which are devoid of solubilzing groups.

3. A disazo pigment color in which one component is a radical of the group consisting of 3-3'-diphenyl benzidine and the methoxy, ethoxy, nitro and halogen derivatives of said benzidine, and the coupling components are the same members of a group consisting of radicals of the acyclic diketones which are devoid of solubilizing groups.

4. A disazo pigment in which one component is the radical of 3,3'-diphenyl benzidine; the coupling components are the same members of a group consisting of radicals of the acyclic diketones; and azo bridges connecting said radicals.

5. A disazo pigment in which one component is a radical of the group consisting of 3-3'-diphenyl benzidine, 3-3'-di(halo-phenyl) benzidine and the methoxy, ethoxy, nitro and halogen derivatives of said benzidines; the coupling components are the same members of a group consisting of radicals of the arylamides of acetoacetic acid of the benzene and naphthalene series.

6. A disazo pigment in which one component is the radical of 3,3'-diphenyl benzidine, the radicals of the coupling components are the same members of a group consisting of radicals of the arylamides of acetoacetic acid of the benzene and naphthalene series, and azo bridges connecting said benzidine radical and the radicals of said coupling components.

7. The azo pigment represented by the formula

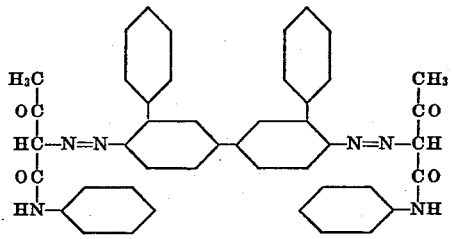

8. The azo pigment represented by the formula

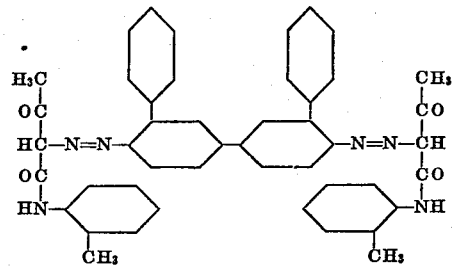

9. The azo pigment represented by the formula

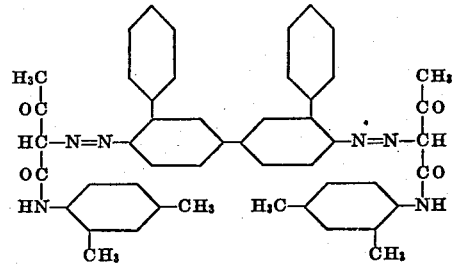

HAROLD E. WOODWARD.
SWANIE S. ROSSANDER.